US012738763B2

(12) United States Patent
Li et al.

(10) Patent No.: US 12,738,763 B2
(45) Date of Patent: Sep. 15, 2026

(54) STARTING METHOD OF ENERGY STORAGE SYSTEM, ENERGY STORAGE SYSTEM AND STARTING DEVICE

(71) Applicant: Contemporary Amperex Technology (Hong Kong) Limited, Hong Kong (CN)

(72) Inventors: Meng Li, Ningde (CN); Guoxiu Wu, Ningde (CN); Yanhua Lu, Ningde (CN); Dongxu Yu, Ningde (CN); Xiangxiang Xu, Ningde (CN); Zhimin Dan, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/963,822

(22) Filed: Nov. 29, 2024

(65) Prior Publication Data

US 2025/0096593 A1 Mar. 20, 2025

Related U.S. Application Data

(63) Continuation of application No. PCT/CN2022/098003, filed on Jun. 10, 2022.

(51) Int. Cl.

*H02J 9/06* (2006.01)
*H02J 7/34* (2006.01)
*H02J 13/333* (2026.01)

(52) U.S. Cl.

CPC .............. *H02J 9/061* (2013.01); *H02J 7/342* (2020.01); *H02J 7/345* (2013.01); *H02J 13/333* (2026.01); *H02J 2207/50* (2020.01)

(58) Field of Classification Search

CPC ...... H02J 9/061; H02J 13/00034; H02J 7/342; H02J 7/345

See application file for complete search history.

(56) References Cited

U.S. PATENT DOCUMENTS

2008/0100143 A1* 5/2008 Lipcsei .................. H02J 7/865 307/80
2012/0038155 A1 2/2012 Bjork
(Continued)

FOREIGN PATENT DOCUMENTS

| CN | 104340787 A | 2/2015 |
|---|---|---|
| CN | 108923524 A | 11/2018 |
| CN | 109066962 A | 12/2018 |

OTHER PUBLICATIONS

The international search report and written opinion of ISA received in the counterpart international application PCT/CN2022/098003, mailed on Aug. 30, 2023.

(Continued)

*Primary Examiner* — Rexford N Barnie
*Assistant Examiner* — Joseph N Inge
(74) *Attorney, Agent, or Firm* — K&L Gates LLP

(57) ABSTRACT

A starting method of an energy storage system is provided. The energy storage system includes at least one energy storage submodule. The energy storage submodule includes a power module and a battery module. The starting method includes: acquiring a first instruction; and controlling the battery module to charge the power module according to the first instruction. Through the starting method, the battery module of the energy storage submodule can be controlled to charge the power module when a power grid is in a completely black state so that the power module can be charged to have the power-on capability, thereby realizing the self-starting of the energy storage submodule and helping to increase the restoration speed of the power grid.

16 Claims, 3 Drawing Sheets

200

Acquiring a second instruction — S203

Controlling the battery module to charge the power module according to the second instruction — S204

Acquiring a first instruction — S201

Controlling the battery module to charge the power module according to the first instruction — S202

(56) References Cited

U.S. PATENT DOCUMENTS

| | | | | |
|---|---|---|---|---|
| 2013/0170311 | A1* | 7/2013 | Lai | H02J 7/345 365/228 |
| 2017/0207637 | A1* | 7/2017 | Sugeno | H02J 3/32 |
| 2018/0188330 | A1* | 7/2018 | Yamamoto | G01R 31/386 |
| 2018/0233931 | A1 | 8/2018 | Beaston | |
| 2021/0028503 | A1* | 1/2021 | Hilligoss | H01M 10/425 |
| 2021/0234380 | A1* | 7/2021 | Ono | H02J 7/54 |
| 2021/0281081 | A1* | 9/2021 | Singer | G01R 31/396 |
| 2022/0263142 | A1* | 8/2022 | Petrovic | H01M 10/4257 |

OTHER PUBLICATIONS

Extended European Search Report, mailed Jul. 2, 2025, for corresponding European Patent Application Serial No. 22945312.1.

* cited by examiner

200

Acquiring a first instruction

S201

Controlling the battery module to charge the power module according to the first instruction

S202

200

Acquiring a second instruction — S203

Controlling the battery module to charge the power module according to the second instruction — S204

Acquiring a first instruction — S201

Controlling the battery module to charge the power module according to the first instruction — S202

STARTING METHOD OF ENERGY STORAGE SYSTEM, ENERGY STORAGE SYSTEM AND STARTING DEVICE

CROSS-REFERENCE TO RELATED APPLICATION

This application is a continuation of International Application No. PCT/CN2022/098003, filed on Jun. 10, 2022, which is hereby incorporated by reference in its entirety.

TECHNICAL FIELD

The present application relates to the field of energy storage, in particular to a starting method of an energy storage system, the energy storage system and a starting device.

BACKGROUND

In practical production and life, a large-area blackout of a power grid is caused by a power system failure. The power grid is in the blackout. To quickly restore the power supply, a black start is needed. The black start, for example, includes the process that during a power grid outage or blackout, part of devices with the self-starting capability start up first to drive devices without the starting capability to start up again so that the restoration range of a power system is gradually expanded to enable the power grid to restore normal power supply finally.

Because power utilization ends of the power grid do not consume power all the time and power supply ends of the power grid need to consistently supply electric energy, the power grid is usually configured with an energy storage system to store the electric energy transmitted from the power supply ends for normal power utilization at the power utilization ends. The energy storage system is an important part of the power grid, usually stores the electric energy by using capacitors, but does not have the self-starting capability during the power grid outage or blackout. Therefore, how to start the energy storage system during the power grid outage or blackout and enable the power grid to restore the normal power supply rapidly is an urgent problem to be solved.

SUMMARY

The embodiment of the present application provides a starting method of an energy storage system, the energy storage system and a starting device. Through the starting method, the energy storage system can self-start during the power grid outage or blackout, thereby effectively increasing the restoration speed of the power grid.

In a first aspect, a starting method of an energy storage system is provided, wherein the energy storage system comprises at least one energy storage submodule which comprises a power module and a battery module, and the starting method comprises: acquiring a first instruction; and controlling the battery module to charge the power module according to the first instruction.

In the embodiment of the present application, the energy storage submodule of the energy storage system has the power module and the battery module. During the power grid blackout, the battery module of the energy storage submodule can charge the power module so that the power module can be charged to have the power-on capability, thereby realizing the self-starting of the energy storage submodule and helping to increase the restoration speed of the power grid.

In some embodiments, the controlling the battery module to charge the power module comprises: connecting a first branch between the battery module and the power module according to the first instruction, wherein the first branch comprises a first switch.

In an embodiment of the present application, the battery module and the power module are connected through the first branch so that the battery module and the power module can be flexibly controlled by controlling the on-off of the first branch to judge whether the battery module and the power module are connected.

In some embodiments, before acquiring the first instruction, the starting method comprises: acquiring a second instruction; and connecting a second branch between the battery module and the power module according to the second instruction, wherein the second branch comprises a second switch and a resistor which are connected in series.

In an embodiment of the present application, the battery module and the power module are connected through the second branch so that whether the battery module and the power module are connected or not can be determined by controlling the on-off of the second branch. Before acquiring the first instruction, the second branch with a resistor is connected according to the second instruction to enable the battery module to charge the power module so that an excessive current is avoided in a charging loop to protect devices in the charging loop.

In some embodiments, the acquiring the first instruction comprises: establishing a communication connection with a battery management controller BMC of the energy storage system; and acquiring the first instruction and/or the second instruction from the BMC.

In some embodiments, a battery monitoring module of the energy storage system communicates with at least one of the BMCs, and the first instruction and/or the second instruction is sent to the BMC by the battery monitoring module.

In some embodiments, a valve base controller VBC of the energy storage system communicates with the battery monitoring module, and the first instruction and/or the second instruction is sent to the battery monitoring module by the VBC.

In some embodiments, a station control system SCS of the energy storage system communicates with at least one of the battery monitoring modules, and the first instruction and/or the second instruction is sent to the battery monitoring module by the SCS.

In some embodiments, a cloud server of the energy storage system communicates with at least one of the battery monitoring modules, and the first instruction and/or the second instruction is sent to the battery monitoring module by the cloud server.

In some embodiments, a valve base controller VBC of the energy storage system communicates with at least one of the BMCs, and the first instruction and/or the second instruction is sent to the BMC by the VBC.

In an embodiment of the present application, the first instruction and/or the second instruction can be acquired in different ways so that the starting method can be flexibly adapted to different communication architectures of the energy storage system, and the energy storage system with the different communication architectures may self-start during the power grid outage or blackout.

In some embodiments, the acquiring the first instruction comprises: acquiring the first instruction in the case that the second branch is connected to enable the power module to reach a rated voltage.

In an embodiment of the present application, when the second branch is connected, the battery module charges the power module through the second branch; when the power module reaches the rated voltage, acquire the first instruction to connect the first branch, i.e. the battery module is switched to the first branch to charge the power module so that the power modules with the power-on capability are all charged through the first branch without the resistor to save power consumption caused by the resistor in the charging process and effectively improve the charging effect of the charging loop.

In a second aspect, the embodiment of the present application provides an energy storage system, comprising control modules and at least one energy storage submodule, the energy storage submodule comprises a power module and a battery module, wherein the control module is configured to acquire a first instruction and control the battery module to charge the power module according to the first instruction.

In some embodiments, the control module is configured to control the first branch between the battery module and the power module to be connected according to the first instruction, wherein the first branch comprises a first switch.

In some embodiments, before acquiring the first instruction, the control module is configured to acquire a second instruction and control a second branch between the battery module and the power module to be connected according to the second instruction, wherein the second branch comprises a second switch and a resistor which are connected in series.

In some embodiments, the energy storage system comprises a battery management system BMC, the BMC establishes a communication connection with at least one of the control modules, and the first instruction and/or the second instruction is sent to the control module by the BMC.

In some embodiments, the energy storage system comprises a battery monitoring module; and the battery monitoring module establishes a communication connection with at least one of the BMCs, and the first instruction and/or the second instruction is sent to the BMC by the battery monitoring module.

In some embodiments, the energy storage system comprises a valve base controller VBC; the VBC establishes a communication connection with the battery monitoring module, and the first instruction and/or the second instruction is sent to the battery monitoring module by the VBC.

In some embodiments, the energy storage system comprises a station control system SCS; the SCS establishes a communication connection with at least one of the battery monitoring modules, and the first instruction and/or the second instruction is sent to the battery monitoring module by the SCS.

In some embodiments, the energy storage system comprises a cloud server; and the cloud server establishes a communication connection with at least one of the battery monitoring modules, and the first instruction and/or the second instruction is sent to the battery monitoring module by the cloud server.

In some embodiments, the energy storage system comprises a valve base controller VBC; and the VBC establishes a communication connection with at least one of the BMCs, and the first instruction and/or the second instruction is sent to the BMC by the VBC.

In some embodiments, in the case that the control module controls the second branch to be connected to enable the power module to reach a rated voltage, the control module acquires the first instruction and controls the first branch to be connected according to the first instruction.

In a third aspect, the embodiment of the present application provides a starting device of the energy storage system, the starting device comprises a processor and a memory, wherein a computer program instruction is stored in the memory, and the processor is configured to execute the computer program instruction and implements the starting method of the energy storage system according to any one of claims 1 to 10 when executing the computer program instruction.

In the third aspect, the embodiment of the present application provides a computer storage medium, and a computer execution instruction is stored therein and is executed by the processor to implement the starting method of the energy storage system according to any one of the embodiments in the first aspect.

BRIEF DESCRIPTION OF THE DRAWINGS

To more clearly illustrate the technical solutions of the embodiments of the present application, the accompanying drawings required by the embodiments of the present application are introduced briefly below, it is obvious that the accompanying drawings depicted below are merely some examples of the present application, and those skilled in the art can also obtain other accompanying drawings based on the accompanying drawings without paying creative work.

DETAILED DESCRIPTION OF EMBODIMENTS

Figures 1, 2:
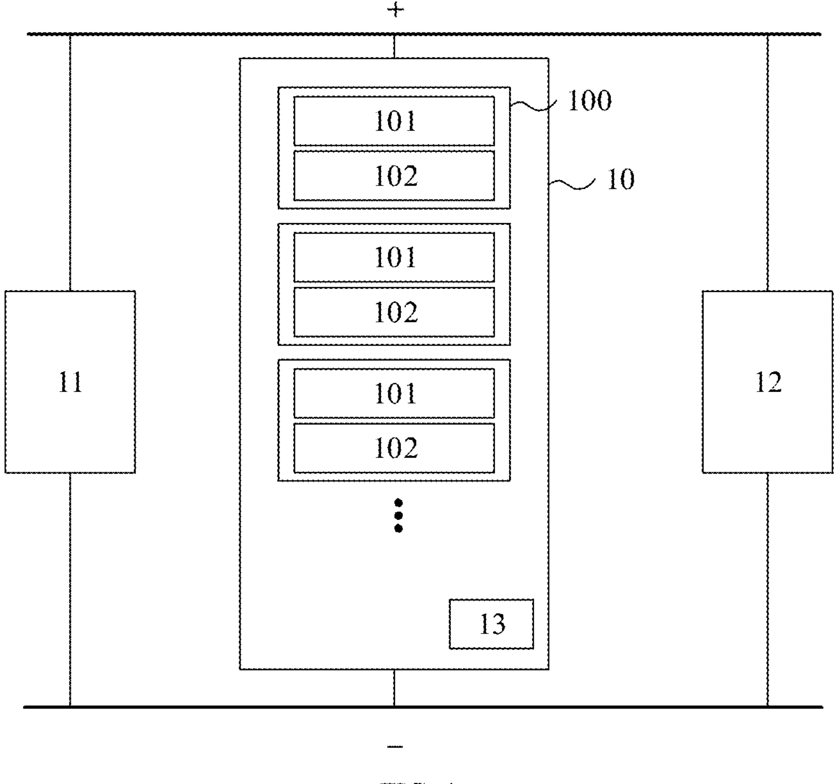
FIG. 1 is a schematic structural diagram of an energy storage system according to the present application.
FIG. 2 is a schematic flow diagram of a starting method of the energy storage system according to the present application.

Implementations of the present application are described in further detail below in conjunction with the accompanying drawings and embodiments. The following detailed description of the embodiments and the accompanying drawings are used to illustrate the principles of the present application but are not intended to limit the scope of the present application, i.e., the present application is not limited to the described embodiments.

In the description of the present application, it should be noted that, unless otherwise noted, "a plurality of" means two or more; orientation o positional relationships indicated by the terms "upper", "lower", "left", "right", "inner", "outer", and the like are only for the convenience of description of the present application and simplification of description rather than indicating or implying that the referenced device or element must have a particular orientation, be constructed and operated in a particular orientation, and thus are not to be construed as limiting the present application. In addition, the terms "first", "second", "third", and the like are used for descriptive purposes only and are not to be construed as indicating or implying relative importance. "Vertical" is not strictly vertical, but within the allowable range of error. "Parallel" is not strictly parallel, but within the allowable range of error.

Orientation words appearing in the following description are all directions shown in the drawings and do not limit the specific structure of the present application. In the description of the present application, it should also be noted that, unless otherwise expressly specified and limited, the terms "mounted", "connected" and "attached" should be understood in a broad sense, for example, it can be "fixedly connected" or "detachably connected", or "integrally connected"; it can be "directly connected" or "indirectly connected through an intermediate medium". The specific meanings of the above terms in the present application may be understood by those of ordinary skill in the art depending on specific circumstances.

The term "and/or" in the present application is simply a description of the association relationship of the associated objects, indicating that three relationships can exist, for example, A and/or B, which may mean: A exists alone, both A and B exist, and B exists alone. In addition, the character "/" in the present application generally indicates an alternative relationship between the front and back associated objects.

Unless otherwise defined, all the technical and scientific terms used in the present application have the same meanings as are commonly understood by those skilled in the art of the present application. Terms used herein in the description of the present application are to describe specific embodiments only and are not intended to limit the present application. The terms "including" and "having" and any variations thereof in the description and claims as well as the drawings of the present application are intended to cover a non-exclusive inclusion. The terms "first", "second", and so on in the description and claims or accompanying drawings of the present application are intended to distinguish different objects, but not to describe particular sequences or primary-secondary relationships.

"Embodiments" mentioned in the present application mean that specific features, structures or features described in conjunction with embodiments can be comprised in at least one embodiment of the present application. The phrase appearing at each position of the description does not necessarily indicate the same embodiment and it is not an exclusively independent or alternative embodiment of other embodiments. Those skilled in the art understand implicitly and explicitly that the embodiments described in the present application can be combined with other embodiments.

The power grid is an important link between a power station and users and plays an important role in guaranteeing power transmission and power distribution between different regions and adjusting voltage levels. For example, electric energy output from the power station is usually high-voltage power to kilovolts, and the users can finally use low-voltage power to hundreds of volts through the power transformation of the power grid. For another example, the geographic location of the power station is restricted by many factors. But the locations of the users are spread broadly and randomly. The electric energy output from the power station can be distributed and transmitted to the users in different regions through the power distribution of the power grid. In daily production and life, there exists the large-area power grid blackout caused by a regional power system failure. At the moment, the power grid is in a blackout; or there exists the power grid blackout caused by a power station failure, and the power station cannot supply electric energy to the power grid temporarily. To rapidly restore the power supply, a black start is needed. The black start means the process that during the power grid blackout, part of the devices with the self-starting capability start up first to drive the devices without the starting capability to start up again to gradually expand the restoration range of the power system and enable the power grid to restore normal power supply finally.

For a traditional power grid architecture, to achieve the functions such as electric energy distribution, power transformation and the like, the power grid usually comprises some energy storage systems to store the electric energy output from the power station. The energy storage system may include a power distribution unit or power transformation equipment and some auxiliary devices. Core components of the power distribution unit, the power transformation equipment and other devices are power modules. The power module usually has transient electric energy storage and conversion functions, i.e., a traditional energy storage system may affect the restoration speed of the power grid without the black-start or self-starting capabilities during the power grid outage or blackout.

Because of this, the embodiment of the present application provides a starting method of an energy storage system. In addition to a power module, the energy storage system also has a battery module which can store energy. According to the starting method, the battery module in the energy storage system can be controlled through an acquired instruction to charge the power module, thereby ensuring the normal operation of the power module. Through the starting method, the energy storage system with the battery module can self-start without being driven by other devices during the power grid outage or blackout, thereby effectively increasing the restoration speed of the power grid during the power grid outage or blackout.

Thanks to the development of battery technologies, a novel energy storage system with batteries as energy storage units is widely used in recent years. FIG. 1 is a schematic structural diagram of an energy storage system according to the embodiment of the present application.

As shown in FIG. 1, the energy storage system 10 comprises at least one energy storage submodule 100, the energy storage submodule 100 comprises a power module 101 and a battery module 102, and the power module 101 and the battery module 102 are connected. One side of the energy storage system 10 is connected to a power feeding end 11 to form a power feeding loop to receive the electric energy, and the other end of the energy storage system 10 is connected with a power receiving end 12 to form a power transmission loop to transmit the electric energy. The voltage of the power feeding loop is usually higher than that of the power transmission loop. The power feeding end 11 may be a power station and may also be other power distribution units, power transformation equipment, auxiliary devices, etc. in the power grid; and the power receiving end 12 may be a user and may also be other power distribution units, power transformation equipment, auxiliary devices, etc. in the power grid, which is not limited in the embodiment of the present application.

It should be understood that, unless otherwise specified, "connections" between modules, between modules and units or between units as described in the embodiments of the present application refer to electrical connections, which may be series connections or parallel connections.

The energy storage submodule 100 may be either a full-bridge energy storage submodule or a half-bridge energy storage submodule, which is not limited in the embodiment of the present application.

In addition to the energy storage submodules 100 as energy storage units, the energy storage system 10 also comprises control modules 13 for managing the energy storage submodules 100. The control modules 13 can implement the functions such as charging and discharging control, safety monitoring and efficiency management on batteries in the energy storage submodules 100. In an example, the control modules 13 may be battery management units BMU for managing a plurality of energy storage submodules 100 in the energy storage system 10. In another example, the control modules 13 may also be sub-battery management units SBMU, the BMUs manage a plurality of SBMUs, and the SBMUs manage the plurality of energy storage submodules 100 in the energy storage system 10.

Based on the energy storage system 10, the embodiment of the present application provides a starting method 200 of the energy storage system 10. FIG. 2 is a schematic flow diagram of the starting method 200 of the energy storage system 10 according to the embodiment of the present application.

The starting method 200 comprises:

S201, acquiring a first instruction; and

S202, controlling the battery module 102 to charge the power module 101 according to the first instruction.

Specifically, after the power grid outage or blackout, because the energy storage submodules 100 in the energy storage system 10 have the battery modules, at the moment, though the power feeding end 11 can no longer supply power to the power modules 101 in the energy storage system 10, the control modules 13 for managing the energy storage submodules 100 can acquire the first instruction for indicating the control modules 13 to control the battery modules 102 to charge the power modules 101. In other words, the control modules 13 can control the battery modules 102 to charge the power module 101 according to the first instruction. Thus, the power modules 101 can still be charged to be turned on during the power grid outage or blackout. The energy storage system 10 can realize self-starting by charging the power modules 101 with the battery modules 102 during the power grid outage or blackout.

It should be understood that the turn-on described in the embodiment of the present application means that devices, systems or modules in the power grid get access to the power grid to realize the use of the functions thereof.

Figures 3, 4:
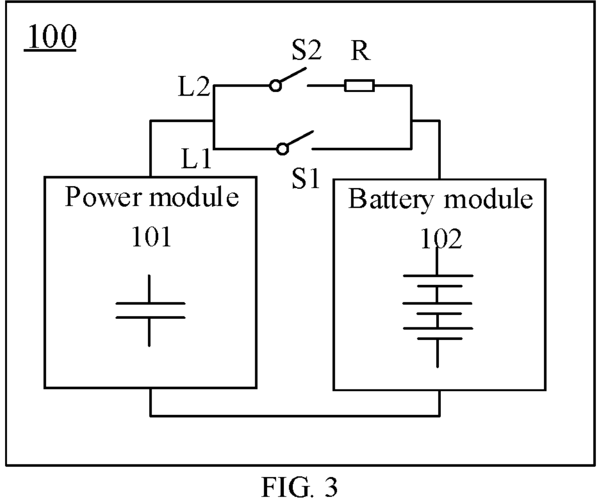
FIG. 3 is a schematic structural diagram of an energy storage submodule according to the present application.
FIG. 4 is another schematic flow diagram of the starting method of the energy storage system according to the present application.

FIG. 3 is a schematic structural diagram of an energy storage submodule 100 according to the embodiment of the present application.

See FIG. 3, optionally, in S202, the controlling the battery module 102 to charge the power module 101 comprises: connecting the first branch L1 between the battery module 102 and power module 101 according to the first instruction, wherein the first branch L1 comprises a first switch S1.

Specifically, in the energy storage submodule 100, the power module 101 and the battery module 102 may be connected through the first branch L1, wherein the first branch L1 comprises the first switch S1. When the first switch S1 is closed, the battery module 102 and the power module 101 are connected; the power module 101 usually comprises a capacitor; when the battery module 102 and the power module 101 are connected, the battery module 102 can charge the power module 101, i.e., the battery module 102 charges the capacitor of the power module 101; and when the first switch S1 is open, the battery module 102 is disconnected from the power module 101.

FIG. 4 is another schematic flow diagram of the starting method 200 of the energy storage system 10 according to the embodiment of the present application.

See FIG. 3 and FIG. 4, optionally, before acquiring the first instruction, the starting method 200 also comprises:

S203, acquiring a second instruction; and

S204, connecting a second branch L2 between the battery module 102 and the power module 101 according to the second instruction, wherein the second branch L2 comprises a second switch S1 and a resistor R which are connected in series.

It should be understood that the energy storage submodule 100 can only comprise the first branch L1, and the power module 101 and the battery module 102 are connected through the first branch L1. The energy storage submodule 100 can only comprise the second branch L2, and the power module 101 and the battery module 102 are connected through the second branch L2. The energy storage submodule 100 can also comprise the first branch L1 and the second branch L2, and the power module 101 and the battery module 102 are connected through the first branch L1 and the second branch L2.

Specifically, in the case that the energy storage submodule 100 only comprises the first branch L1, in the starting method 200, the control module 13 controls the power module 101 and the battery module 102 to be connected through the first branch L1 by acquiring the first instruction so that the battery module 102 can charge the power module 101 during the power grid outage or blackout.

In the case that energy storage submodule 100 only comprises the second branch L2, in the starting method 200, the control module 13 controls the power module 101 and the battery module 102 to be connected through the second branch L2 by acquiring the second instruction so that the battery module 102 can charge the power module during the power grid outage or blackout. Compared with the first branch L1, the second branch L2 comprises the second switch S2 and the resistor R. Thus, when the battery module 102 charges the power module 101 through the second branch L2, the current of the charging loop will be lower than the current during charging the power module 101 by the battery module 102 through the first branch L1.

In the case that the energy storage submodule 100 comprises the first branch L1 and the second branch L2, the first branch L1 and the second branch L2 are connected in parallel. In other words, as soon as any one of the first branch L1 and the second branch L2 are connected, the power module 101 and the battery module 102 can be connected. According to the starting method 200, firstly, the control module 13 may acquire the second instruction and control the power module 101 and the battery module 102 to be connected through the second branch L2 so that the battery module 102 charges the power module 101 with a low current; and secondly, the control module 13 acquires the first instruction and controls the first branch L1 to be connected, at the moment, the second branch L2 is equivalently short-connected, and the battery module 102 charges the power module 101 with a high current.

In the embodiment, there may be many connection modes between the power module 101 and the battery module 102, which can flexibly adapt to different application demands. In the starting method 200, by acquiring the second instruction first and the first instruction second, the power module 101 and the battery module 102 are connected through the second branch L2 first and connected through the first branch L1 second. Thus, the battery module 102 charges the power module 101 with the low current first and charges the power module 101 with the high current second. Devices can be protected against damage caused by the excessive current in the charging loop. Elements and components in the energy storage submodule 100 are effectively protected to help to prolong the service life of the energy storage submodule 100.

Optionally, in S201, the acquiring the first instruction comprises: acquiring the first instruction when the second branch L2 is connected to enable the power module 101 to reach the rated voltage.

Specifically, the battery module 102 charges the power module 101 through the second branch L2 with a low current at first. When reaching the rated voltage, the power module 101 acquires the first instruction and controls the first branch L1 to be connected. When the power module 101 reaches the rated voltage, it means that the power module 101 has reached the rated power, can work properly and may be turned on at any time. At the moment, there will be no excessive current occurring in the charging loop to damage the devices. Because the power module 101 is charged, the battery module 102 charges the power module 101 through the first branch L1 without causing an excessive current in the charging loop. Thus, after reaching the rated voltage, the power module 101 acquires the first instruction and controls the battery module 102 in time to charge the power module 101 through the first branch L1 without the resistor R. The damage of the excessive current in the charging loop to the devices during earlier charging can be avoided. The power consumption caused by the resistor R in the charging loop during later charging can be reduced.

In the embodiment, when the power module 101 reaches the rated voltage and acquires the first instruction, the charging loop of the power module 101 is switched to the first branch L1, which can ensure safety in the charging process and effectively save unnecessary power consumption in the charging process, thereby improving the charging efficiency of the charging loop and the energy utilization rate.

Figure 5:
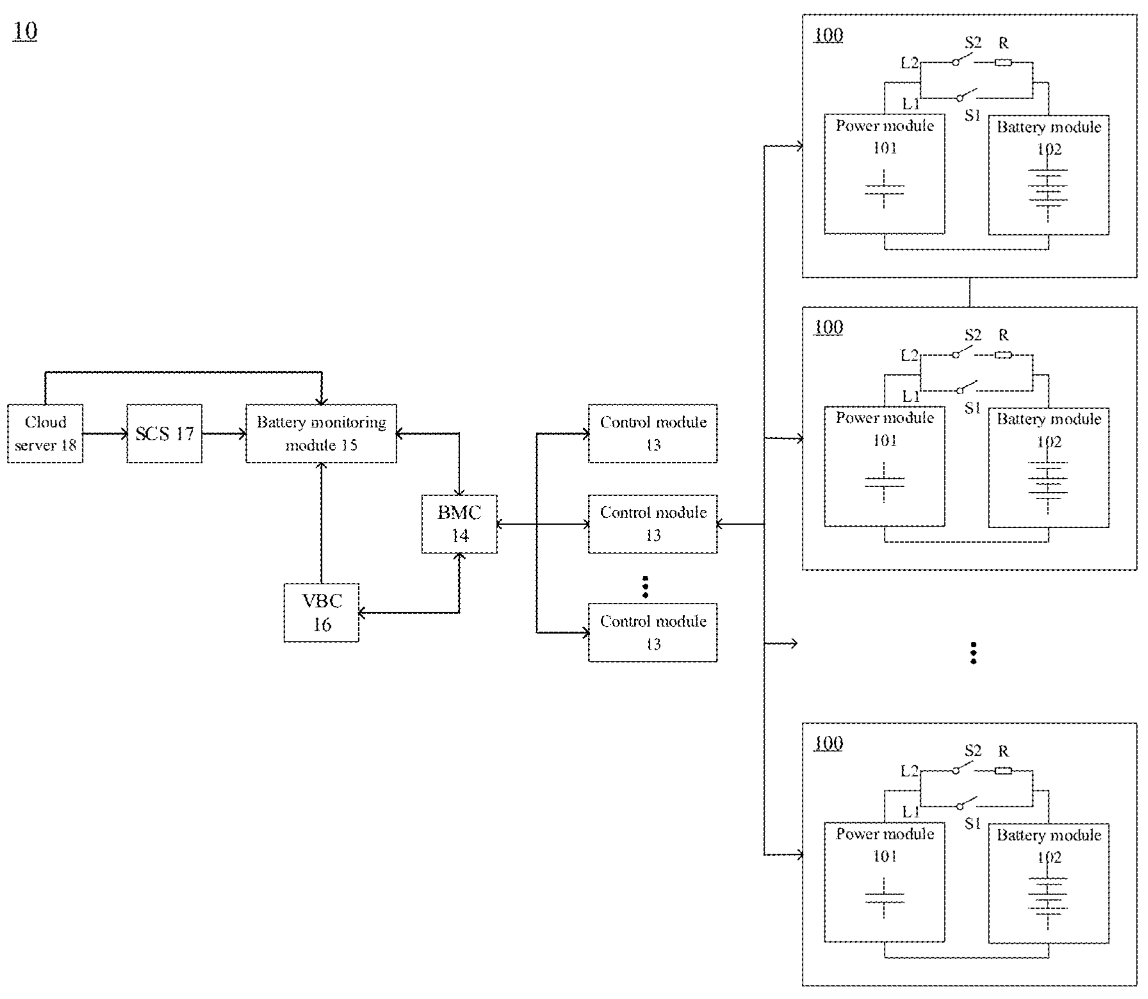
FIG. 5 is another schematic structural diagram of the energy storage system according to the present application.

FIG. 5 is another schematic structural diagram of the energy storage system 10 according to the embodiment of the present application.

The energy storage system 10 usually comprises lots of energy storage submodules 100. Each energy storage submodule 100 comprises lots of batteries. Thus, the batteries are usually managed by using a distributed topological structure in the energy storage submodule 10. The distributed topological structure, namely the energy storage system 10, comprises a host machine and slave machines. One energy storage system 10 may comprise one or more slave machines and realizes management on the lots of batteries through communications between the host machine and the slave machines. The distributed topological structure has high flexibility and can adapt to different capacities and specifications of batteries or battery modules, thereby being widely used. It should be understood that the host machines and the slave machines described in the present application are relative concepts, for example, the modules, units or devices for transmitting instructions or demands are the host machines, and the modules, units or devices for receiving the instructions or commands are the slave machines.

See FIG. 5, optionally, the energy storage system 10 comprises the battery management controller BMC 14. The BMC 14 can establish a communication connection with the control modules 13 of the energy storage submodules to acquire relevant parameters of the batteries and estimate and monitor states of charge SOC and working conditions of the batteries and can monitor and control internal temperatures of the batteries and communicate with other controllers.

Optionally, see FIG. 5, the energy storage system 10 comprises the battery monitoring module 15. The battery monitoring module 15 can establish the communication connection with the BMC 14 to acquire the relevant parameters of the batteries. The battery monitoring module 15 can acquire the relevant parameters of the batteries from one or more BMCs 14 to process data or communicate with the other controllers and transmit the data to the other controllers.

Optionally, see FIG. 5, the energy storage system 10 comprises the valve base controller VBC 16. The VBC 16 usually serves as a middleware interface between a station-level control system and a subordinate module or a submodule controller to control, protect and detect valves in the system and communicate with the station control system or other controllers.

Optionally, see FIG. 5, the energy storage system 10 comprises the station control system SCS 17. The SCS 17 is configured to respond promptly to, analyze and process information or data in the station to achieve the functions such as event logging, switch control, data collection and processing, etc., and can communicate with other controllers inside the station or an upper-level controller outside the station. The above-mentioned station may be a battery switching station, a substation, an energy storage power station, and the like.

Optionally, see FIG. 5, the energy storage system 10 comprises the cloud server 18. The cloud server 18 is configured to store and record relevant events, instructions or data of the energy storage system 10 and communicate with other controllers.

Based on the architecture of the energy storage system 10, the approach that the control module 13 of the energy storage submodule 100 acquires the first instruction and/or the second instruction is further described below.

Optionally, in S201, the acquiring the first instruction comprises: establishing the communication connection with the BMC 14 of the energy storage system 10; and acquiring the first instruction and/or the second instruction from the BMC 14, i.e., the first instruction and/or the second instruction may be stored in the BMC 14 and is sent to the control module 13 by the BMC 14.

Optionally, the battery monitoring module 15 of the energy storage system 10 communicates with the at least one BMC 14. The first instruction and/or the second instruction is sent to the BMC 14 by the battery monitoring module 15, i.e., the first instruction and/or the second instruction may be stored in the battery monitoring module 15 and is sent to the BMC 14 by the battery monitoring module 15 and then sent to the control modules 13 by the BMC 14.

Optionally, the VBC 16 of the energy storage system 10 communicates with the battery monitoring module 15, and the first instruction and/or the second instruction is sent to the battery monitoring module 15 by the VBC 16, i.e., the first instruction and/or the second instruction may be stored in the VBC 16 and is sent to the battery monitoring module 15 by the VBC 16, then sent to the BMC 14 by the battery monitoring module 15 and finally sent to the control modules 13 by the BMC 14.

Optionally, the VBC 16 of the energy storage system 10 communicates with the at least one BMC 14. The first instruction and/or the second instruction is sent to the BMC 14 by the VBC 16, i.e., the VBC 16 may directly communicate with the BMC 14 without the battery monitoring module 15. The first instruction and/or the second instruction may be stored in the VBC 16 and is sent to the BMC 14 by the VBC 16 and then sent to the control modules 13 by the BMC 14.

Optionally, the SCS 17 of the energy storage system 10 communicates with the at least one battery monitoring module 15, and the first instruction and/or the second instruction is sent to the battery monitoring module 15 by the SCS 17, i.e. the first instruction and/or the second instruction may be stored in the SCS 17 and is sent to the battery monitoring module 15 by the SCS 17, then sent to the BMC 14 by the battery monitoring module 15 and finally sent to the control modules 13 by the BMC 14.

Optionally, the cloud server 18 of the energy storage system 10 communicates with the at least one battery monitoring module 15, and the first instruction and/or the second instruction is sent to the battery monitoring module 15 by the cloud server 18, i.e. the first instruction and/or the second instruction is stored in the cloud server 18 and is sent to the battery monitoring module 15 by the cloud server 18, then sent to the BMC 14 by the battery monitoring module 15 and finally sent to the control modules 13 by the BMC 14.

Optionally, the cloud server 18 of the energy storage system 10 communicates with the at least one SCS 17. The first instruction and/or the second instruction is sent to the SCS 17 by the cloud server 18, i.e., the first instruction is stored in the cloud server 18 and is sent to the SCS 17 by the cloud server 18, then sent to the battery monitoring module 15 by the SCS 17, sent to the BMC 14 by the battery monitoring module 15 and finally sent to the control modules 13 by the BMC 14.

From this, according to the starting method 200 of the energy storage system 10 of the present application, the energy storage system 10 can acquire the first instruction and/or the second instruction in different ways to flexibly adapt to different energy storage system 10 architectures or different communication architectures so that the different energy storage systems 10 all can self-start by the starting method 200 during the power grid blackout.

It should be understood that the above "communication connections" may be wired communication connections, such as communication through a control area network CAN communication bus or a daisy chain communication bus, and may also be wireless communication connections, such as a wireless network, Bluetooth and a cellular network. The way of communication connections is not limited in the embodiment of the present application.

See FIG. 5, the embodiment of the present application further provides the energy storage system 10. The energy storage system 10 comprises the controller modules 13 and at least one energy storage submodule 100. The energy storage submodule 100 comprises the power module 101 and the battery module 102, wherein the control module 13 is configured to acquire the first instruction and control the battery module 102 to charge the power module 101 according to the first instruction.

Optionally, the control module 13 is configured to control the first branch L1 between the battery module 102 and power module 101 to be connected according to the first instruction, wherein the first branch L1 comprises the first switch S1.

Optionally, before acquiring the first instruction, the control module 13 is configured to acquire the second instruction and control the second branch L2 between the battery module 102 and the power module 101 to be connected according to the second instruction, and the second branch L2 comprises the second switch S2 and the resistor R which are connected in series.

Optionally, the energy storage system 10 comprises the BMC 14. The BMC 14 establishes the communication connections with the at least one control module 13, and the first instruction and/or the second instruction is sent to the control module 13 by the BMC 14.

Optionally, the energy storage system 10 comprises the battery monitoring module 15. The battery monitoring module 15 establishes the communication connection with the at least one BMC 14. The first instruction and/or the second instruction is sent to the BMC 14 by the battery monitoring module 15.

Optionally, the energy storage system 10 comprises the VBC 16. The VBC 16 establishes the communication connection with the battery monitoring module 15, and the first instruction and/or the second instruction is sent to the battery monitoring module 15 by the VBC 16.

Optionally, the VBC 16 establishes the communication connection with at least one BMC 14. The first instruction and/or the second instruction is sent to the BMC 14 by the VBC 16.

Optionally, the energy storage system 10 comprises the station control system SCS 17. The SCS 17 establishes a communication connection with the at least one battery monitoring module 15, and the first instruction and/or the second instruction is sent to the battery monitoring module 15 by the SCS 17.

Optionally, the energy storage system 10 comprises the cloud server 18. The cloud server 18 establishes a communication connection with the at least one battery monitoring module 15, and the first instruction and/or the second instruction is sent to the battery monitoring module 15 by the cloud server 18.

Optionally, the cloud server 18 establishes a communication connection with at least one station control system SCS 17. The first instruction and/or the second instruction is sent to the station control system SCS 17 by the cloud server 18.

Optionally, in the case that the control module 13 controls the second branch L2 to be connected to enable the power module 101 to reach the rated voltage, the control module 13 is configured to acquire the first instruction and control the first branch L1 to be connected according to the first instruction.

The modules or units in the energy storage system 10 can be configured to implement the steps of the starting method 200 of the energy storage system 10 to achieve similar technical effects, which is not repeated here again.

Figure 6:
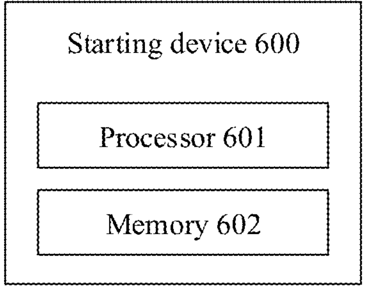
FIG. 6 is a schematic structural diagram of a starting device of the energy storage system according to the present application.

FIG. 6 is a schematic structural diagram of a starting device 600 of the energy storage system 10 according to the embodiment of the present application. As shown in FIG. 6, the starting device 600 comprises a processor 601 and a memory 602, wherein a computer program instruction is stored in the memory 602, and the processor 601 is configured to execute the computer program instruction. The processor 601 can implement the starting method 200 according to any one of the embodiments of the present application when executing the computer program instruction.

The memory 602 may be a Read-only memory ROM, a static storage device and a random access memory RAM. The memory 602 may store a program. When the program stored in the memory 602 is executed by the processor 601, the processor 601 is configured to perform the steps of the starting method 200 according to the embodiment of the present application.

The processor 601 may adopt a general-purpose central processing unit CPU, a microprocessor, an application specific integrated circuit ASIC, a graphics processing unit GPU or one or more integrated circuits and is configured to execute the related program to implement functions that need to be executed by the units in the device according to the embodiment of the present application or implement the starting method 200 according to the embodiment of the present application.

The processor 601 may also be an integrated circuit chip and has a signal processing capability. During the implementing process, the steps of the starting method 200 according to the embodiment of the present application may be completed through an integrated logic circuit of hardware in the processor 601 or instructions in the form of software.

The processor 601 may also be a general-purpose processor, a digital signal processor DSP, an ASIC, a field programmable gate array FPGA or other programmable logic devices, discrete or transistor logic devices and discrete hardware components. The processor may implement or execute the methods, steps and logic block diagrams disclosed according to the embodiments of the present application. The general-purpose processor may be a microprocessor or may also be any conventional processor, and so on. The steps of the method disclosed in conjunction with the embodiments of the present application may be embodied directly in the hardware processor to be executed and completed or in a combination of hardware and software modules in the processor to be executed and completed. The software modules may be located in a mature storage medium of the field, such as RAM, flash memory, ROM, a programmable ROM or an erasable programmable memory and a register. The storage medium is located in the memory 602. The processor 601 reads information stored in the memory 602 and is in conjunction with the hardware thereof to complete the functions to be executed by the units comprised in the device 600 according to the embodiment of the present application or execute the starting method 200 according to the embodiment of the present application.

It should be understood that though the starting device 600 only shows the memory and processor, in the specific implementation process, those skilled in the art should understand that the starting device 600 also comprises hardware devices for implementing other additional functions according to the specific demands. In addition, those skilled in the art should understand that the starting device 600 may only comprise the devices necessary for implementing the embodiment of the present application, but not necessarily comprise all the devices shown in FIG. 6.

The embodiment of the present application also provides a computer storage medium. The computer program instruction is stored in the computer storage medium and is used for implementing the starting method 200 according to any one of the embodiments of the present application when executed by the processor.

Those of ordinary skill in the art may be aware that units in the examples described in conjunction with the embodiments of the present application disclosed herein can be realized through electronic hardware, computer software, or the combination of computer software and electronic hardware. To clearly illustrate the interchangeability of hardware and software, the constitutions and steps of each example are generally described by functionality in the above description. Whether these functions are performed in the form of hardware or software depends on specific application and design constraint conditions of the technical scheme. Skilled artisans may implement the described functions of each specific application in different ways, but such implementation should not be interpreted as a departure from the scope of the present application.

In the several embodiments provided in the present application, it should be understood that the disclosed system and devices may be implemented in other ways. For example, the device embodiments described above are only illustrative. For example, the division of units is only a logical function division. In actual implementation, there may be other division methods. For example, multiple units or components may be combined or integrated into another system, or some features may be omitted, or not implemented. In addition, displayed or discussed mutual coupling or direct coupling or communication connections may be indirect coupling or communication connections through some interfaces, devices or units, and may be in electrical, mechanical or other connection forms.

The units described as separate components may or may not be physically separated, and the components displayed as units may or may not be physical units, that is, they may be located in one place, or they may be distributed on multiple network units. Some or all of the units may be selected according to actual needs to achieve the purposes of the schemes of the embodiment of the present application.

In addition, the functional units in the various embodiments of the present application may be integrated into one processing unit, or each unit may exist alone physically, or two or more units may be integrated into one unit. The integrated units may be realized in the form of hardware and may also be realized in the form of a software functional unit.

The integrated units, if implemented in the form of software functional units and sold or used as separate products, may be stored in a computer-readable storage medium. Based on such understanding, the technical solution of the present application, which is essential or contributes to the prior art, or all or part of the technical solution, may be embodied in the form of a computer software product, which is stored in a storage medium, including a plurality of instructions used to cause a computer device (which may be a personal computer, server, or network device, etc.) to perform all or part of the steps of the methods described in various embodiments of the present application. The foregoing computer-readable storage medium includes a U disk, a mobile hard disk, a read-only memory (ROM), a random-access memory (RAM), a magnetic disk, or an optical disk, and other various types of mediums, which can store program codes.

It should be understood that the specific examples herein are only intended to assist in better understanding of the embodiments of the present application by those skilled in the art, and not to limit the scope of the embodiments of the present application.

It should also be understood that in the embodiments of the present application, the serial numbers of the processes do not mean the execution sequence, and the execution sequence of each process should be determined by its function and internal logic, and should not constitute any limitation on the implementation processes of the embodiments of the present application.

It should also be understood that all the implementations described in this specification may be implemented alone or may be implemented in the form of a combination. The embodiments of the present application are not limited thereto.

Although the present application has been described with reference to preferred embodiments, various improvements can be made thereto and equivalents can be used for the replacement of members therein without departing from the scope of the present application. Most of all, on the premise of no structural conflict, the technical features mentioned in the embodiments can be combined in any way. The present application is not restricted to particular embodiments disclosed herein but comprises all technical solutions falling in the scope of the claims.

What is claimed is:

1. A starting method of an energy storage system, wherein the energy storage system comprises at least one energy storage submodule, the energy storage submodule comprises a power module and a battery module, and the starting method comprises:

acquiring a first instruction; and controlling the battery module to charge the power module according to the first instruction, wherein the controlling the battery module to charge the power module comprises connecting a first branch between the battery module and the power module according to the first instruction, wherein the first branch comprises a first switch, wherein before acquiring the first instruction, the starting method comprises:

acquiring a second instruction; and connecting a second branch between the battery module and the power module according to the second instruction, wherein the second branch comprises a second switch and a resistor which are connected in series.

2. The starting method according to claim 1, wherein the acquiring the first instruction comprises:

establishing a communication connection with a battery management controller BMC of the energy storage system; and acquiring the first instruction and the second instruction from the BMC.

3. The starting method according to claim 2, wherein a battery monitoring module of the energy storage system communicates with the BMC, and the first instruction and the second instruction are sent to the BMC by the battery monitoring module.

4. The starting method according to claim 3, wherein a valve base controller (VBC) of the energy storage system communicates with the battery monitoring module, and the first instruction and/or the second instruction is sent to the battery monitoring module by the VBC.

5. The starting method according to claim 2, wherein a station control system (SCS) of the energy storage system communicates with at least one of a plurality of battery monitoring modules, and the first instruction and the second instruction are sent to the at least one battery monitoring module by the SCS.

6. The starting method according to claim 2, wherein a cloud server of the energy storage system communicates with at least one of a plurality of battery monitoring modules, and the first instruction and the second instruction are sent to the at least one battery monitoring module by the cloud server.

7. The starting method according to claim 2, wherein a valve base controller (VBC) of the energy storage system communicates with the BMC, and the first instruction and the second instruction are sent to the BMC by the VBC.

8. The starting method according to claim 1, wherein the acquiring the first instruction comprises:

acquiring the first instruction when the second branch is connected to enable the power module to reach a rated voltage.

9. An energy storage system, comprising:

control modules and at least one energy storage submodule, and the energy storage submodule comprises a power module and a battery module, wherein the control modules are configured to acquire a first instruction and control the battery module to charge the power module according to the first instruction, wherein the control modules are configured to control a first branch between the battery module and the power module to be connected according to the first instruction, wherein the first branch comprises a first switch, wherein before acquiring the first instruction, the control modules are configured to acquire a second instruction and control a second branch between the battery module and the power module to be connected according to the second instruction, wherein the second branch comprises a second switch and a resistor which are connected in series.

10. The energy storage system according to claim 9, comprising:

a battery management controller BMC; and the BMC establishes a communication connection with at least one of the control modules, and the first instruction and the second instruction are sent to the control modules by the BMC.

11. The energy storage system according to claim 10, comprising:

a battery monitoring module; and the battery monitoring module establishes a communication connection with the BMC, and the first instruction and the second instruction are sent to the BMC by the battery monitoring module.

12. The energy storage system according to claim 11, comprising:

a valve base controller (VBC); and the VBC establishes a communication connection with the battery monitoring module, and the first instruction and the the second instruction are sent to the battery monitoring module by the VBC.

13. The energy storage system according to claim 11, comprising:

a station control system (SCS); and the SCS establishes a communication connection with at least one of the battery monitoring modules, and the first instruction and the second instruction are sent to the battery monitoring module by the SCS.

14. The energy storage system according to claim 11, comprising:

a cloud server; and the cloud server establishes a communication connection with at least one of a plurality of battery monitoring modules, and the first instruction and the second instruction are sent to the battery monitoring module by the cloud server.

15. The energy storage system according to claim 9, wherein when the control module controls a second branch to be connected so that the power module reaches a rated voltage, the control module acquires the first instruction and controls the first branch to be connected according to the first instruction.

16. A starting device of the energy storage system, comprising:

a processor and a memory, wherein a computer program instruction is stored in the memory, the processor is configured to execute the computer program instruction, and the processor executes the computer program instruction to implement the starting method of an energy storage system according to claim 1.

* * * * *